United States Patent [19]

Mannino, Jr.

[11] Patent Number: 4,674,616
[45] Date of Patent: Jun. 23, 1987

[54] FRICTION DISC WITH SEGMENTED CORE PLATE AND FACINGS

[75] Inventor: Anthony Mannino, Jr., Lombard, Ill.

[73] Assignee: Borg-Warner Corporation, Chicago, Ill.

[21] Appl. No.: 827,574

[22] Filed: Feb. 10, 1986

Related U.S. Application Data

[62] Division of Ser. No. 462,503, Jan. 31, 1983, abandoned.

[51] Int. Cl.⁴ .................. F16D 13/64; F16D 13/72
[52] U.S. Cl. ..................... 192/107 R; 188/264 D; 192/113 B
[58] Field of Search .......... 192/113 B, 107 M, 107 R, 192/70.13, 70.14, 70.12; 188/251 A, 71.1, 71.5, 73.2, 218 XL, 71.6, 264 D

[56] References Cited

U.S. PATENT DOCUMENTS

| | | | |
|---|---|---|---|
| 2,237,624 | 4/1941 | Oldham | 192/107 R |
| 2,690,248 | 9/1954 | McDowall | 192/113 B |
| 3,081,842 | 3/1963 | Zindler et al. | 188/264 X |
| 3,613,851 | 10/1971 | Ely et al. | 192/107 R |
| 4,260,047 | 4/1981 | Nels | 192/107 R X |
| 4,287,978 | 9/1981 | Staub, Jr. | 192/113 B |
| 4,313,533 | 2/1982 | Aschauer | 192/113 B |
| 4,396,100 | 8/1983 | Eltze | 192/113 B X |
| 4,436,193 | 3/1984 | Smirl | 192/113 B X |

Primary Examiner—Rodney H. Bonck
Attorney, Agent, or Firm—James A. Geppert

[57] ABSTRACT

A friction disc for use in multiplate friction wet clutch packs in automatic transmissions for vehicles or other friction clutch applications wherein an annular core plate is segmented with interlocking end portions to form a ring, and the friction facings are also segmented and are bonded to the core plate with the facing segments overlapping the interlocking ends of the core plate segments. Also, the ends of the friction facing segments may be interlocked or slightly spaced apart to form oil channels therebetween, and openings may be formed in the core pieces to intersect circumferentially offset radial channels opening into opposite edges of the friction segment to form oil passages into the disc.

9 Claims, 9 Drawing Figures

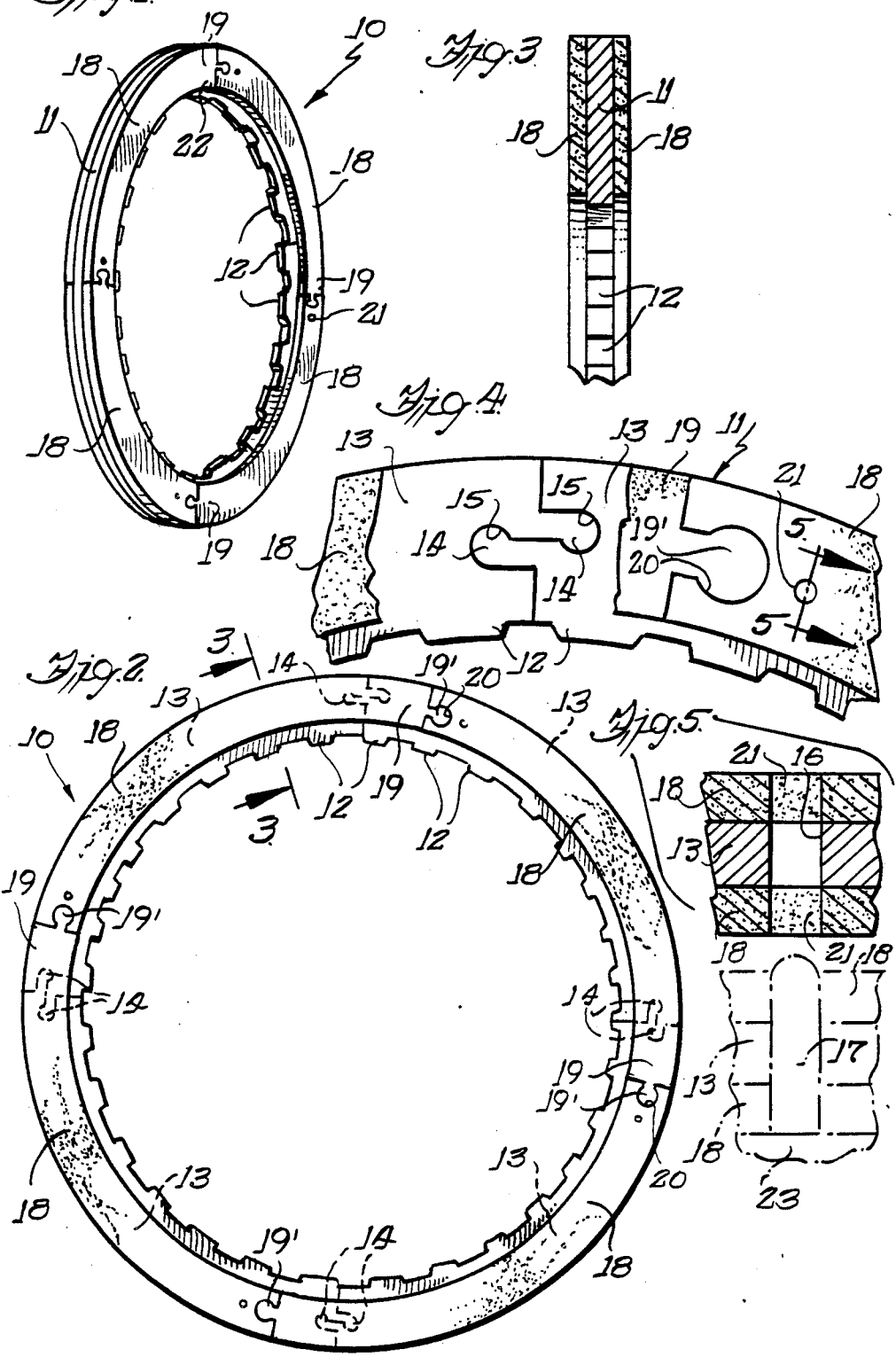

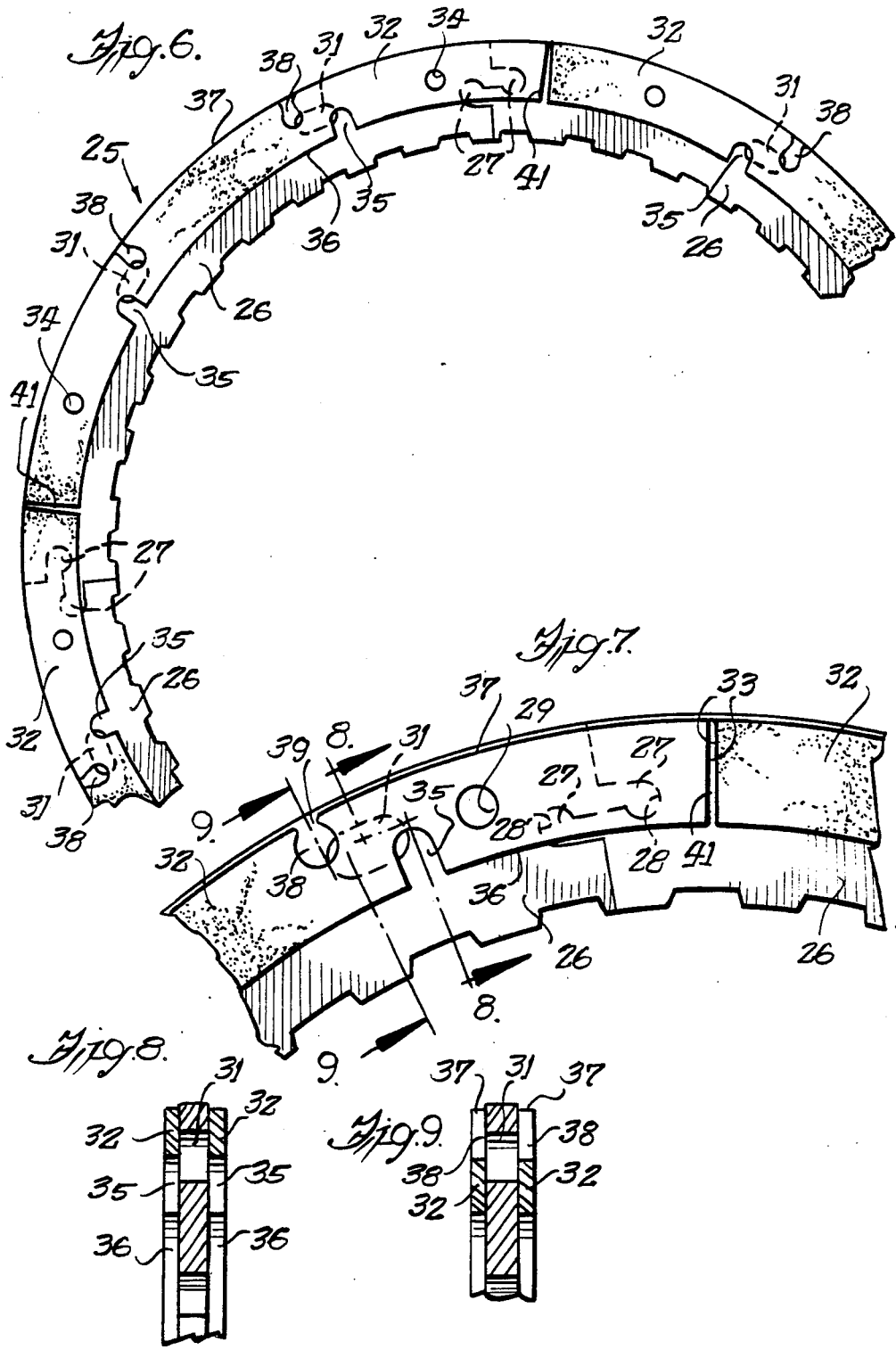

FRICTION DISC WITH SEGMENTED CORE PLATE AND FACINGS

This is a division of application Ser. No. 462,503 filed Jan. 31, 1983 and now abandoned.

BACKGROUND OF THE INVENTION

The present invention relates to annular friction rings or discs which are conventionally utilized in wet clutch packs of interleaved clutch plates that are alternately connected to an inner hub and an outer drum of a clutch assembly and are engaged to rotate the parts together by a hydraulically or spring-actuated piston. A friction disc or plate normally consists of an annular steel ring or plate, which serves as a core plate, and a pair of annular friction facings that are riveted or otherwise secured to the core plate to complete the friction disc.

Blanking out the friction rings and annular core plate produces considerable offal which averages to approximately two-thirds of the total material used. This results in a considerable problem of recycling material, and certain friction materials cannot be recycled which is particularly wasteful and expensive.

To overcome the problem of offal in the blanking out of the annular friction facings, the U.S. Pat. No. 4,260,047 to Nels advanced the concept of an annular core plate and segmented friction facings having tab and slot interlocking ends. The friction facings consist of quarter circle segments which are blanked out of a rectangular sheet of friction material that is formed with a plurality of parallel grooves, with the tabs and slots formed in ungrooved portions. The segments are interconnected to form a ring and are bonded to the core plate. Although waste friction material is reduced, the grooving process and the waste of steel in blanking out the core plate remains. The present invention improves on the process of the Nels patent.

SUMMARY OF THE INVENTION

The present invention comprehends the provision of a novel friction plate or disc having both a segmented core plate and segmented friction facings wherein there is a considerable savings in material for both the steel core plate and friction material. The core plate has a plurality of arcuate segments with tab and slot end portions which interlock to form an annular core plate. The friction facings are also formed of arcuate segments that overlap the interlocking end portions of the core plate and are suitably bonded thereto on both faces. The facing segments do not need to be interconnected together, and the bonding of the friction segments to the interlocked core plate segments in an overlapping manner prevents disassembly of the core plate.

The present invention also comprehends the provision of a friction disc formed of a segmented core plate and segmented friction facings and the method of assembly of the segments to form the disc. Both the interlocking core plate segments and the friction facing segments are perforated to permit the use of alignment pins for handling, orientation and alignment of the segments for assembly and bonding. Also, the alignment holes may allow oil to pass therethrough from one side of the assembled plate to the other when in use for pressure equalization.

The present invention further comprehends the provision of a novel friction disc wherein the friction facings do not require grooves formed in the facing surfaces to allow the circulation of oil for cooling. As the facing segments need not be interlocked, when the facing segments are bonded to the core plate, a space is provided between adjacent ends of facing segments for an oil channel. Also, slots or openings can be formed in the core plate to intersect channels formed in the facing segments for increasing oil flow.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a perspective view of a friction disc according to the present invention.

FIG. 2 is a rear elevational view of the friction disc assembly of FIG. 1.

FIG. 3 is a cross-sectional view taken on the line 3—3 of FIG. 2.

FIG. 4 is an enlarged partial rear elevational view of the friction disc with portions broken away.

FIG. 5 is a cross-sectional view of a portion of the friction disc taken on the line 5—5 of FIG. 4 showing the method of assembly.

FIG. 6 is an enlarged partial rear elevational view of an alternate embodiment of friction disc.

FIG. 7 is a further enlarged rear elevational view of a portion of the friction disc with parts broken away.

FIG. 8 is a cross-sectional view taken on the line 8—8 of FIG. 7.

FIG. 9 is a cross-sectional view taken on the line 9—9 of FIG. 7.

DESCRIPTION OF PREFERRED EMBODIMENT

Referring more particularly to the disclosure in the drawings wherein are shown illustrative embodiments of the present invention, FIGS. 1 through 5 disclose a friction disc or plate 10 which may be utilized in a multi-plate clutch pack for an automatic transmission or for any other suitable clutch plate application. The friction disc 10 includes a steel core plate 11 which may have teeth 12 on either the inner or outer periphery thereof. The core plate is formed of four arcuate metal segments 13, each segment having a tab 14 and adjacent slot 15 at each end with the tab 14 and slot 15 at either end being complementary to and conformably receiving a tab 14 and slot 15 of the next adjacent segment. Also, one or more openings 16 are provided in each segment 13 to receive alignment pins 17 (see FIG. 5) for purposes of assembly. When the tabs 14 and slots 15 of the segments 13 are interlocked, an annular plate or ring 11 is formed.

Also, four arcuate friction facing segments 18 are provided to form a generally annular facing on each surface of the plate 11. Each segment 18 has a tab 19′ on one end 19 and a slot 20 on the opposite end and has openings 21 for the alignment pins 17; the slot 20 of one segment being complementary to and conformably receiving the tab 19′ of the next adjacent segment. Each friction segment 18 is bonded to the core plate 11 with an end 19 overlapping the interlocking tabs 14 and slots 15 of each pair of adjoining core segments 13. The adjacent segments 18 are interlocked in the same manner as the core plate segments to provide annular friction rings.

To manufacture the friction discs 10, an assembly fixture 23 may be utilized with the alignment pins 17 positioned therein for reception of the segments. After unloading a completed disc, the fixture is inspected for cleanliness and then at successive stations has friction segments 18 for one surface, adhesively coated core segments 13 and then friction segments 18 for the opposite surface loaded onto the alignment pins. The loaded fixture has heat and pressure applied to bond the friction segments to the interlocked core segments. After pressing, the fixture and completed disc are cooled and the disc unloaded. Although disclosed as four core segments and four friction segments for each face, manufacturing efficiency and disc size may dictate other numbers of segments. For example, a disc may comprise four core segments with eight friction segments for each facing. Also, the alignment pins 17 may be eliminated if a fixture is utilized that will handle the interlocked annular rings.

FIGS. 6 through 9 disclose an alternate embodiment of the present invention wherein the friction disc 25 includes four quarter circle core segments 26, each having adjacent tabs 27 and slots 28 at the opposite ends with each slot 28 being complementary to and receiving the tab 27 of the next adjacent segment. Openings 29 are formed in the segments 26 to receive the alignment pins utilized in assembly, and circumferentially elongated openings 31 are located in the segments for purposes of oil circulation.

The arcuate friction segments 32 have generally square ends 33, small openings 34 for the alignment pins, U-shaped slots 35 opening into the inner periphery 36 and extending radially outward to the approximate mid-point of the facing segment. Opening into the outer periphery 37 of each segment are radially outwardly extending slots 38 having a narrowed neck 39 adjacent the segment edge. The slots 38 are slightly circumferentially offset from the slots 35.

As seen in FIGS. 7, 8 and 9, when the friction segments 32 are assembled and bonded onto the interlocked core segments 26 in overlapping relation, both of a pair of slots 35 and 38 partially overlap an elongated opening 31 in the core segment to provide interconnected oil channels. A pair of slots 35 and 38 in the friction segments 32 on opposite sides of the core ring may both partially overlap a single opening 31. Also, the narrowed neck 39 of each outer slot 38 provides a restricted opening to impede the outward flow of oil and assure that the slots are full of oil during rotation of the disc. The ends 33 of adjacent segments 32 are so formed that together an outwardly tapered oil channel 41 is formed therebetween, also to assure that the channels are full of oil during rotation. If there is sufficient overlap between the openings 31 and the slots 35 and 38, these generally aligned openings may be used to receive the alignment pins for assembly of the friction disc.

Furthermore, in the final product, the aligned openings 29 and 34 in the core segments 26 and friction segments 32, respectively, may allow for passage of oil from one side of the plate to the other for pressure equalization; this function also being true for the aligned openings 16 and 21 in the friction disc 10. In both embodiments, any necessary oil channels are achieved without a secondary operation to machine or press grooves into the face of each friction segment, although additional oil grooves may be cut or pressed into the facings if deemed necessary. Also, thinner facing material can be utilized in the present embodiments than if friction material with embossed oil grooves or riveted fasteners were used.

I claim:

1. A friction disc for use in a clutch pack comprising an annular core plate and a pair of substantially annular fiction facings, one facing being secured to each of the opposite surfaces of the core plate, each friction facing having pairs of circumferentially offset slots opening alternately into the inner and outer peripheries of the facing to form oil channels, and means in said core plate communicating between said inner and outer offset slots of said facings.

2. A friction disc as set forth in claim 1, wherein said communication means comprises an elongated opening in the core plate partially overlapping each pair of offset slots.

3. A friction disc as set forth in claim 2, wherein each said elongated opening overlaps a pair of offset slots in the friction facings on the opposite surfaces of the core plate.

4. A friction disc formed of an annular core plate and substantially annular friction facings secured to the opposite surfaces of the core plate, the improvement comprising a plurality of arcuate core segments forming the annular core plate, each segment having at least a tab at one end and a slot at the opposite end conformably receiving the tab of the next adjacent segment to interlock the segments together, and a plurality of arcuate friction segments forming each friction facing, each segment being bonded to the core segments to overlap the interlocked ends of a pair of adjoining core segments, each friction segment having pairs of circumferentially offset slots opening alternately into the inner and outer peripheries of the segment to form oil channels, each core segment having an elongated opening formed therein partially overlapping each pair of offset slots to allow communication therebetween.

5. A friction disc as set forth in claim 4, in which said friction segments are bonded to the core segments with sufficient spacing between the ends thereof to form an oil channel.

6. A friction disc as set forth in claim 5, wherein said oil channels are outwardly tapered to assure that the channels are filled with oil during rotation.

7. A friction disc as set forth in claim 4, in which the slots in the friction segments opening into the outer periphery have narrowed necks to impede oil flow therethrough.

8. A friction disc as set forth in claim 4, in which said elongated opening in a core segment overlaps a pair of offset slots in friction segments on the opposite surfaces of the core segment.

9. A friction disc formed of an annular core plate and substantially annular friction facings secured to the opposite surfaces of the core plate, said core plate being formed of a plurality of arcuate core segments, each segment having at least one tab at one end and a slot at the opposite end conformably receiving the tab of the next adjacent segment to interlock the segments together, and each said friction facing being formed of a plurality of arcuate friction segments, each segment being bonded to the core segments to overlap the interlocked ends of a pair of adjoining core segments, each friction segment having pairs of circumferentially offset slots opening alternately into the inner and outer peripheries of the segment to form oil channels, and means in said core plate communicating between said inner and outer offset slots.

* * * * *